United States Patent
Kondo et al.

(10) Patent No.: US 11,783,636 B2
(45) Date of Patent: *Oct. 10, 2023

(54) SYSTEM AND METHOD FOR DETECTING ABNORMAL PASSENGER BEHAVIOR IN AUTONOMOUS VEHICLES

(71) Applicant: Robert Bosch GmbH, Stuttgart (DE)

(72) Inventors: Yumi Kondo, San Jose, CA (US); Ryan Burt, San Jose, CA (US); Krishnan Bharath Navalpakkam, San Jose, CA (US); Alexander Hirsch, Gross-Rohrheim (DE); Naveen Ramakrishnan, Campbell, CA (US); Filipe Goncalves, Braga (PT); Stefan Weissert, Detroit, MI (US); Jayanta Kumar Dutta, Sunnyvale, CA (US); Ravi Kumar Satzoda, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 240 days.

This patent is subject to a terminal disclaimer.

(21) Appl. No.: 17/347,692

(22) Filed: Jun. 15, 2021

(65) Prior Publication Data

US 2021/0312238 A1 Oct. 7, 2021

Related U.S. Application Data

(63) Continuation of application No. 16/716,580, filed on Dec. 17, 2019, now Pat. No. 11,132,585.

(51) Int. Cl.
*G06V 10/84* (2022.01)
*G06V 40/20* (2022.01)
(Continued)

(52) U.S. Cl.
CPC .......... *G06V 40/23* (2022.01); *G06F 18/2155* (2023.01); *G06F 18/23* (2023.01);
(Continued)

(58) Field of Classification Search
CPC ........ G06V 10/84; G06V 40/20; G06V 40/23; G06V 20/41; G06V 20/52; G06V 20/59;
(Continued)

(56) References Cited

U.S. PATENT DOCUMENTS

2016/0189371 A1 6/2016 Krishna Rao et al.
2017/0351928 A1* 12/2017 Yamanaka ............... H04N 5/33
(Continued)

FOREIGN PATENT DOCUMENTS

| CN | 104156979 A | * | 11/2014 | |
|---|---|---|---|---|
| CN | 105320944 A | * | 2/2016 | ......... G06K 9/00369 |
| CN | 108234463 A | * | 6/2018 | ......... H04L 63/1425 |

OTHER PUBLICATIONS

Nallaivarothayan, Hajananth, Clinton Fookes, Simon Denman, and Sridha Sridharan. "An MRF based abnormal event detection approach using motion and appearance features." In 2014 11th IEEE International Conference on Advanced Video and Signal Based Surveillance (AVSS), pp. 343-348. IEEE, 2014. (Year: 2014).*
(Continued)

*Primary Examiner* — Carol Wang
(74) *Attorney, Agent, or Firm* — Maginot, Moore & Beck LLP (57) ABSTRACT

A method and system are disclosed for monitoring passengers in within a cabin of a vehicle and determining whether the passengers are engaging in abnormal behavior. The method and system uses a novel vector to robustly and numerically represent the activity of the passengers in a respective frame, which is referred to herein as an "activity vector." Additionally, a Gaussian Mixture Model is utilized (Continued)

by the method and system to distinguish between normal and abnormal passenger behavior. Cluster components of the Gaussian Mixture Model are advantageously learned using an unsupervised approach in which training data is not labeled or annotated to indicate normal and abnormal passenger behavior. In this way, the Gaussian Mixture Model can be trained at a very low cost.

20 Claims, 8 Drawing Sheets

(51) Int. Cl.
*G06V 20/59* (2022.01)
*G06F 18/214* (2023.01)
*G06F 18/23* (2023.01)

(52) U.S. Cl.
CPC .............. *G06V 10/84* (2022.01); *G06V 20/59* (2022.01); *G06V 20/597* (2022.01); *G06V 40/20* (2022.01)

(58) Field of Classification Search
CPC ... G06V 20/597; G06F 18/2155; G06F 18/23; G06F 18/29; G06F 18/2411
See application file for complete search history.

(56) References Cited

U.S. PATENT DOCUMENTS

| | | |
|---|---|---|
| 2018/0089534 A1* | 3/2018 | Ye .................... G06V 40/173 |
| 2019/0258253 A1* | 8/2019 | Tremblay ............ G05D 1/0088 |
| 2020/0172036 A1 | 6/2020 | Sakai et al. |
| 2020/0285870 A1* | 9/2020 | Yi ........................ B60W 50/14 |
| 2021/0307621 A1* | 10/2021 | Svenson ............ A61B 5/02416 |

OTHER PUBLICATIONS

Zhu, Guangming, Liang Zhang, Peiyi Shen, and Juan Song. "An online continuous human action recognition algorithm based on the kinect sensor." Sensors 16, No. 2 (2016): 161. (Year: 2016).*
Ponce, Vctor, Miguel Reyes, Xavier Baro, Mario Gorga, Sergio Escalera, and A. G. Keskar. "Two-level GMM clustering of human poses for automatic human behavior analysis." GVIP Journal 7, No. 2 (2007). (Year: 2007).*
Xiang, Tao, and Shaogang Gong. "Video behaviour profiling and abnormality detection without manual labelling." In Tenth IEEE International Conference on Computer Vision (ICCV'05) vol. 1, vol. 2, pp. 1238-1245. IEEE, 2005. (Year: 2005).*
CN108234463 translation (Year: 2018).*

* cited by examiner

SYSTEM AND METHOD FOR DETECTING ABNORMAL PASSENGER BEHAVIOR IN AUTONOMOUS VEHICLES

This application is a continuation application of U.S. patent application Ser. No. 16/716,580, filed on Dec. 17, 2019, the disclosure of which is hereby incorporated herein by reference in its entirety.

FIELD

The device and method disclosed in this document relates to in-vehicle sensing systems and, more particularly, to detecting abnormal passenger behavior in autonomous vehicles.

BACKGROUND

Unless otherwise indicated herein, the materials described in this section are not prior art to the claims in this application and are not admitted to the prior art by inclusion in this section.

In the near future, driverless cars, such as autonomous taxis operated for on-demand mobility service, will play an important role in transportation. It will soon become common practice for passengers, who are strangers to each other, to share an autonomous taxi. Unlike a traditional taxi, where a driver can supervise the passengers, autonomous taxis will need surveillance systems to monitor the safety of passengers. Any abnormal behaviors of passengers, such as violent activities, should be detected and monitored for its prevention. Accordingly, it would be beneficial to provide a monitoring system for monitoring passengers within the cabin of an autonomous vehicle and intelligently detect abnormal passenger behavior.

SUMMARY

A method for detecting abnormal passenger behavior in a vehicle is disclosed. The method comprises receiving, with a processing system, a first image frame of at least one passenger in a cabin of the vehicle from an image sensor. The method further comprises determining, with the processing system, based on the first image frame, a first numerical vector representing a pose and a motion of the at least one passenger in the first image frame. The method further comprises detecting, with the processing system, based on the first numerical vector, abnormal passenger behavior in the first image frame using a mixture model having a plurality of cluster components representing normal passenger behaviors.

A system for detecting abnormal passenger behavior in a vehicle is disclosed. The system comprises an image sensor configured to generate and output image frames of at least one passenger in a cabin of the vehicle. The system further comprises a processing system operably connected to the image sensor and including at least one processor. The processing system is configured to receive a first image frame from the image sensor. The processing system is further configured to determine, based on the first image frame, a first numerical vector representing a pose and a motion of the at least one passenger in the first image frame. The processing system is further configured to detect, based on the first numerical vector, abnormal passenger behavior in the first image frame using a mixture model having a plurality of cluster components representing normal passenger behaviors.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 1:
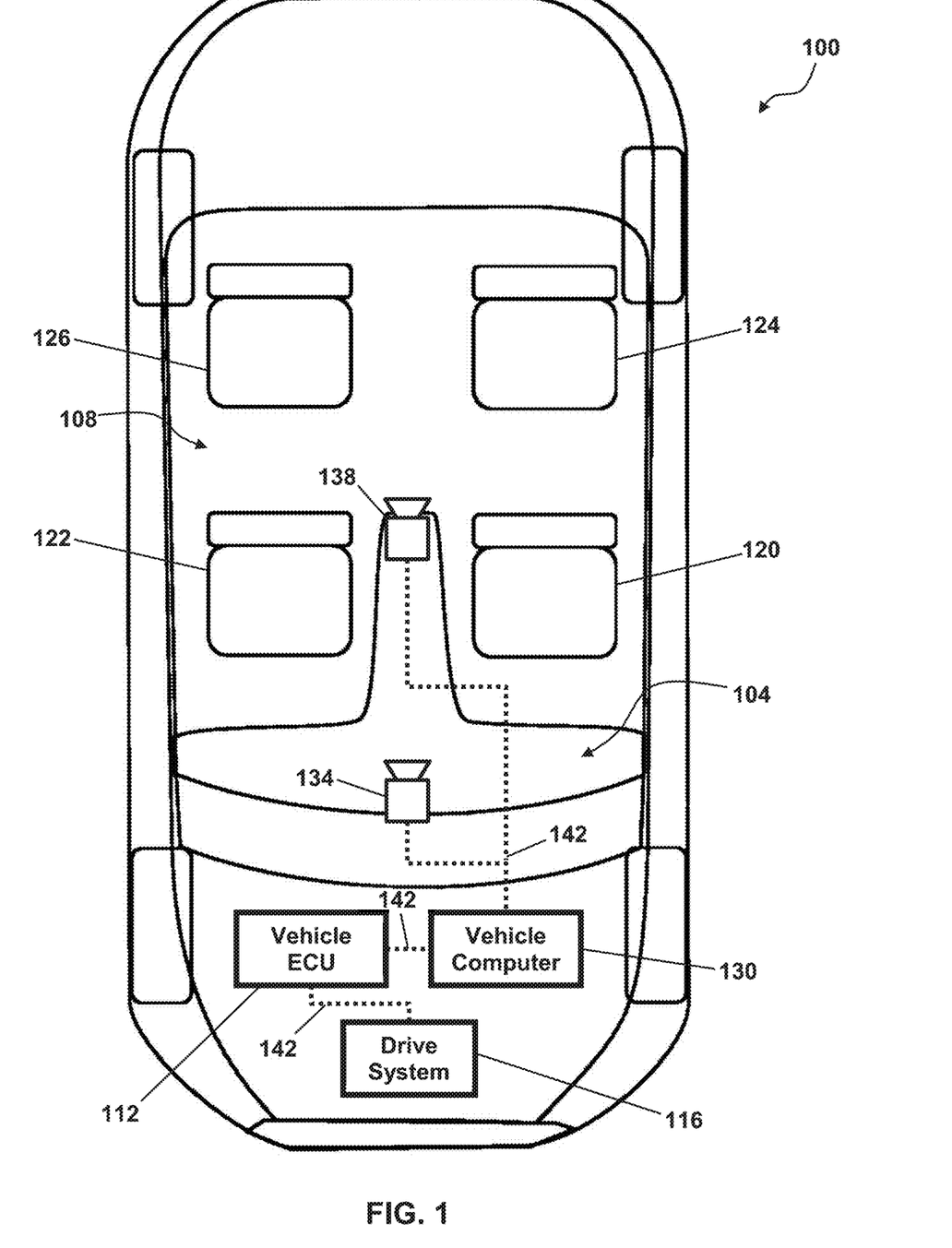
FIG. 1 is a schematic top view of a vehicle with a cabin monitoring system.
Figure 2:
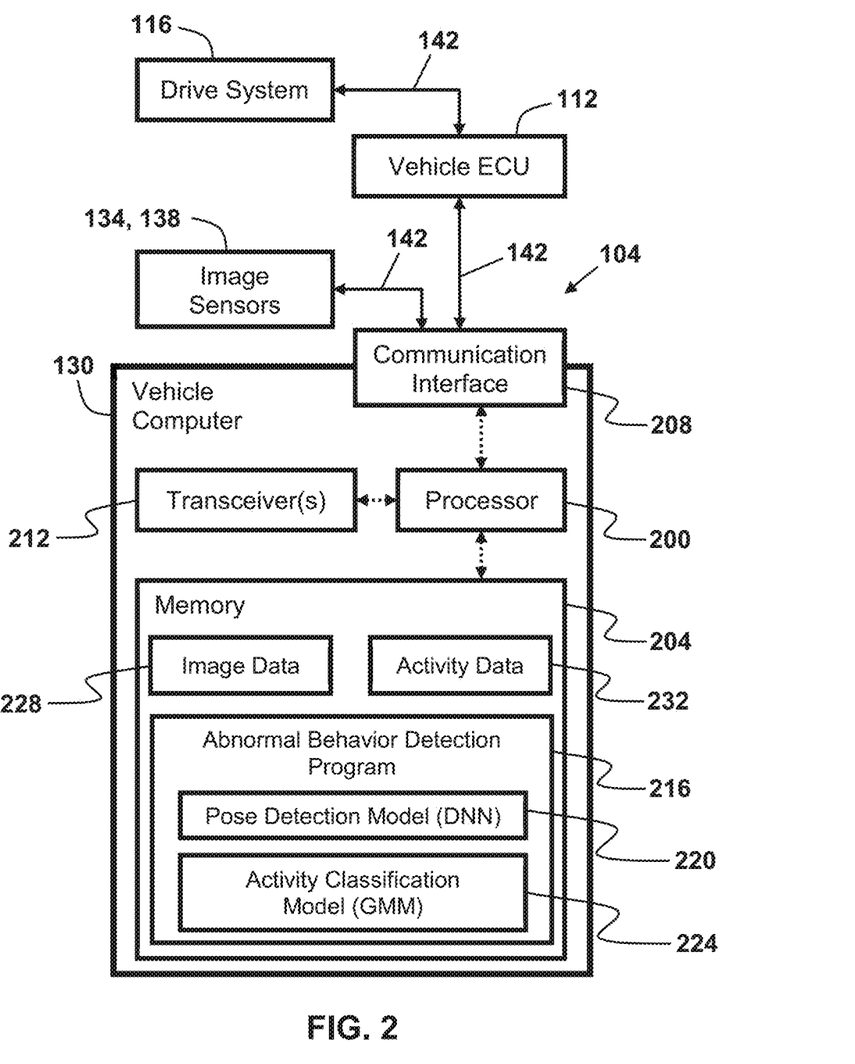
FIG. 2 is a schematic view of components of the vehicle and the cabin monitoring system of FIG. 1.

With reference to FIGS. 1-2 an exemplary embodiment of a vehicle 100 having a cabin monitoring system 104 is disclosed. The cabin monitoring system 104 is advantageously configured to monitor passengers in within a cabin 108 of the vehicle 100 and determine whether the passengers are engaging in abnormal behavior. In addition to the cabin monitoring system 104, the vehicle 100 includes a vehicle electronic control unit ("ECU") 112 configured to operate a drive system 116, as well as various electronics of the vehicle aside from the cabin monitoring system 104, such as lights, locks, speakers, displays, etc. The drive system 116 of the vehicle 100 includes a drive motor, for example an internal combustion engine and/or one or more electric motors, that drives the wheels of the vehicle 100, and the steering and braking components that enable the vehicle 100 to be moved in a controlled manner.

In the illustrated embodiment of FIG. 1, the vehicle 100 is the form of an automobile. However, in other embodiments, the vehicle 100 may include any number of types of vessels having one or more cabins 108 for moving people, such as trains, buses, subways, aircraft, helicopters, passenger drones, submarines, elevators, and passenger moving pods. The cabin 108 (which may also be referred to herein as a compartment) is a typically closed room for accommodating passengers. Although the vehicle 100 is illustrated as having a single cabin 108, it will be appreciated that the vehicle 100 may include any number of individual and separate cabins 108 (e.g., multiple compartments or rooms inside a train car). In the illustrated embodiment, the cabin 108 includes four seats 120, 122, 124, 126 in which passengers can be seated. However, the cabin 108 may include more or less seats depending on the configuration and type of the vehicle 100. The vehicle 100 also includes one or more doors (not shown) enabling passengers to access the cabin 108 and the seats 120-126. In addition, the vehicle 100 may include a rear hatch (not shown) enabling a user to access a cargo storage area of the vehicle 100, for example a trunk or storage space behind the rear seats 124, 126.

In at least one embodiment, the vehicle 100 is a shared autonomous automobile that is configured to provide autonomous transportation services in which the vehicle 100 drives autonomously to the location of a passenger and then, upon the passenger entering the vehicle 100, autonomously transports the passenger to a desired location using the public roadway network. The passenger may engage the autonomous transportation services of the vehicle 100 using a smartphone or smart device application (i.e. an "app"), for example. The passenger is also referred to herein as an occupant, a user, an operator, or a person. In other embodiments, the vehicle 100 is any type of passenger vehicle, as described above, and, in some embodiments, may be occupant controlled or remotely controlled.

The cabin monitoring system 104 comprises a vehicle computer 130 that is operably connected to one or more image sensors 134, 138 that are arranged throughout the vehicle. The image sensors 134, 138 may be video or still image RGB cameras, each of which has, for example, a charge-coupled device (CCD) or an active-pixel sensor for generating digital image data in the form of image frames. In other embodiments, the image sensors 134, 138 may include thermal or infrared sensors, a radar imaging system, a LIDAR imaging system, or another suitable imaging system.

In the illustrated embodiment, the cabin monitoring system 104 includes two interior image sensors 134, 138 arranged within the cabin 108 and configured to generate an image of a portion of the cabin 108. In one embodiment, the interior image sensors 134, 138 are arranged in or on the roof of the vehicle 100 and directed downwardly into the cabin 108 toward the respective seat or seats 120-126 for imaging. In other embodiments, the interior image sensors 134, 138 may be arranged in the seats or in the dash of the vehicle 100. For example, in one particular embodiment, the image sensors for imaging the front seats 120, 122 are arranged in the dash of the vehicle 100, while the image sensors for imaging the rear seats 124, 126 are arranged in the front seat 120, 122 that is directly in front of the respective rear seat 124, 126. In some embodiments, additional exterior image sensors (not shown) may be arranged on an exterior of the vehicle 100 so as to generate an image of a portion of the exterior of the vehicle 100.

In the illustrated embodiment, the front image sensor 134 generates digital image data of the front of the cabin, including the front seats 120, 122, and the rear image sensor 138 generates digital image data of the rear of the cabin 108, including the rear seats 124, 126. In other embodiments, the cabin monitoring system 104 may include a single image sensor that captures images of the entire cabin 108, including all of the seats 120-126, a separate image sensor directed at each of the seats 120-126, or any desired configuration of image sensors to generate digital images of each seat in the vehicle.

The vehicle computer 130 is configured to process image data received from one or more of the image sensors 134, 138 to monitor passengers in within the cabin 108 of the vehicle 100 and determine whether the passengers are engaging in abnormal behavior. The vehicle computer 130 may additional be configured to perform other complex tasks such as autonomous navigation of the vehicle 100 and interfacing with the passengers or a smartphone in the possession of the passenger to provide autonomous transportation of the passenger.

With reference now to FIG. 2, exemplary components of the vehicle computer 130 of the cabin monitoring system 104 are described. In the illustrated embodiment, the vehicle computer 130 comprises at least a processor 200 and associated memory 204. The memory 204 is configured to store program instructions that, when executed by the processor 200, enable the vehicle computer 130 to perform various operations described elsewhere herein, at least including monitoring passengers in within the cabin 108 of the vehicle 100 and determining whether the passengers are engaging in abnormal behavior. The memory 204 may be of any type of device capable of storing information accessible by the processor 200, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 200 may include a system with a central processing unit, graphics processing units, multiple processing units, dedicated circuitry for achieving functionality, programmable logic, or other processing systems.

In the illustrated embodiment, the vehicle computer 130 further includes a communication interface 208 configured to enable the vehicle computer 130 to communicate with the image sensors 134, 138 and with the vehicle ECU 112 via one or more communication buses 142, which may take the form of one or more a controller area network (CAN) buses. The communication interface 212 may include physical terminals for connecting to wired media (e.g., the communication buses 142). Additionally, the communication interface assembly 212 may include one or more modems, bus controllers (e.g., a suitable CAN bus controller), or other such hardware configured to enable communications with the image sensors 134, 138 and the vehicle ECU 112.

In the illustrated embodiment, the vehicle computer 130 further includes one or more radio transceiver(s) 212 configured to communicate with a remote server (e.g., a cloud service), as well as with a smartphone or other smart device in the possession of the passenger, for the purpose of providing autonomous transportation services. The radio transceivers(s) 212 may include transceivers configured to communicate with the Internet via wireless telephony networks, such as Global System for Mobiles ("GSM") or Code Division Multiple Access ("CDMA") transceivers. Additionally, the radio transceiver(s) 212 may include a Bluetooth® or Wi-Fi transceiver configured to communicate locally with a smartphone or other smart device in the possession of the passenger.

As will be described in greater detail below, the memory 204 of the vehicle computer 130 stores program instructions corresponding to an abnormal behavior detection program 216. The abnormal behavior detection program 216 includes program instructions and learned parameters corresponding to a pose detection model 220 and to an activity classification model 224. Additionally, the memory 204 stores image data 228 including image frames received from the image sensors 134, 138, and activity data 232 representing the activity of the passengers in each image frame.

Methods for Detecting Abnormal Passenger Behavior

The cabin monitoring system 104 is advantageously configured to monitor passengers in within the cabin 108 of the vehicle 100 and determine whether the passengers are engaging in abnormal behavior. For explanatory purposes only, it is noted that abnormal passenger behaviors may comprise violent behaviors such as arguing, fighting, grabbing, kicking, punching, pushing, or slapping, as well as non-violent behaviors such as undressing. In contrast, normal passenger behavior may comprise behaviors such as talking, touching, hugging, sitting still, drinking coffee, or crossing legs.

As will be discussed in greater detail below, the cabin monitoring system 104 uses a novel vector to robustly and numerically represent the activity of the passengers in a respective frame, which is referred to herein as an "activity vector" for the respective image frame. Additionally, the activity classification model 224 includes a mixture model, in particular a Gaussian Mixture Model (GMM), utilized by the cabin monitoring system 104 to distinguish between normal and abnormal passenger behavior. Particularly, based on training data in the form of video of passengers riding in the cabin 108 of the vehicle 100, Gaussian Mixture Modeling is used to learn cluster components representing activity vectors corresponding to normal passenger behavior. Thus, the cabin monitoring system 104 can determine whether the passengers are engaging in abnormal behavior by comparing activity vectors representing actual passenger behavior to the learned cluster components representing normal passenger behavior. Thus, it will be appreciated that, as used herein as it relates to the activity classification model 224 and/or the mixture model thereof, the terms "abnormal behavior" or "abnormal passenger behavior" merely refer to passenger behavior that is uncommon or rare in the training data and no particular qualitative or value-based meaning is ascribed to the terms.

Advantageously, an unsupervised approach can be utilized in which the training data is not labeled or annotated to indicate normal and abnormal passenger behavior. Particularly, because abnormal behaviors, such as violence, are generally rare, unannotated video of passengers riding in the cabin 108 of the vehicle 100 can be used to learn the cluster components representing normal passenger behavior. This unsupervised approach is advantageous because a large corpus of training data can be collected and used for training at a very low cost. Additionally, because the definition of abnormal behavior, such as violence, varies across individuals so the quality of the annotations would be questionable in supervised approaches, which in turn would result in poor performance. Moreover, since abnormal behavior, such as violence, rarely occurs in practice, it would be hard to gather all the possible abnormal behavior in training data in supervised approaches. Furthermore, supervised approaches tend to rely on heavily hand-crafted features that may work well with the existing training data, but may not be generalizable to detect future abnormal behavior when it is different from the abnormal behavior in the training data.

Figure 3:
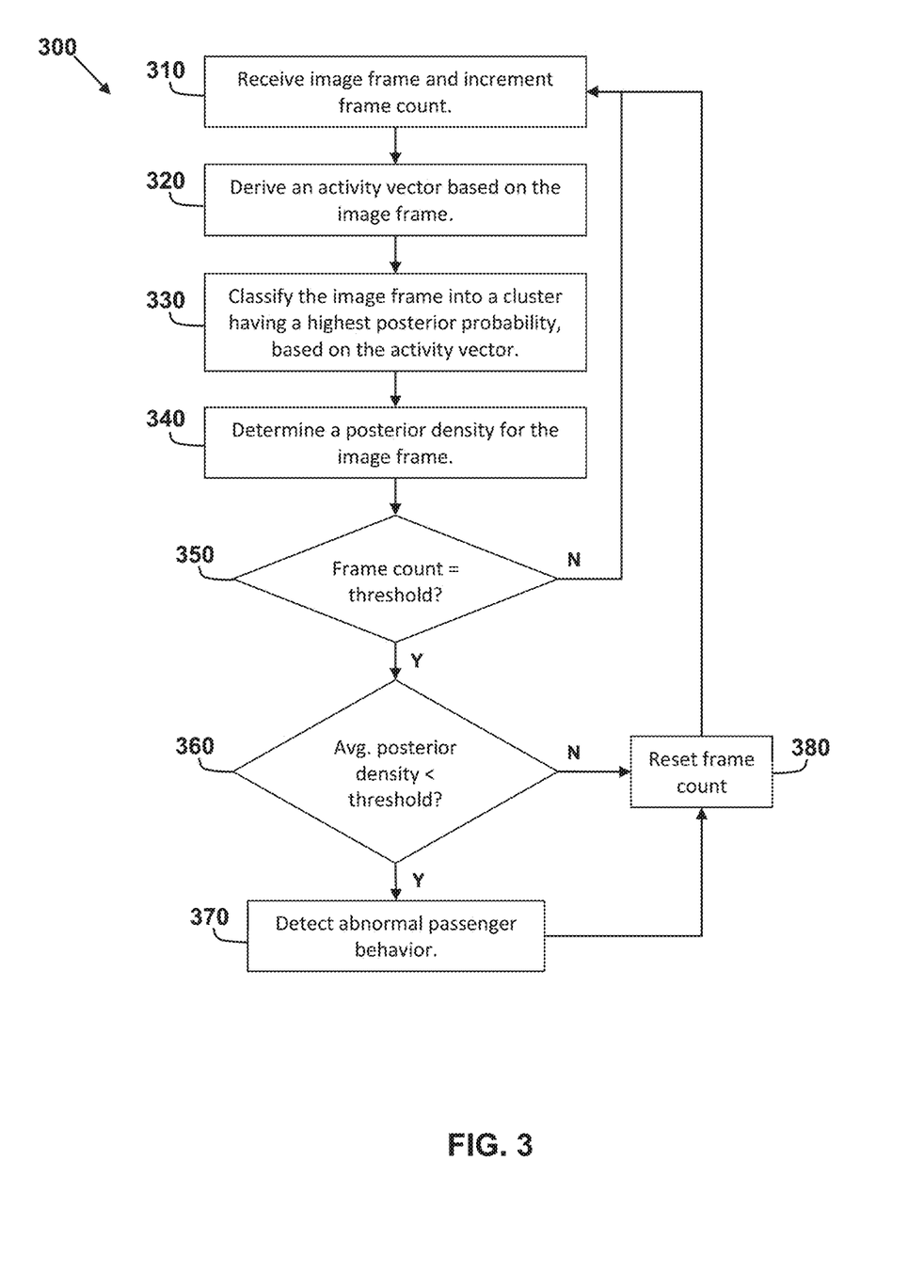
FIG. 3 shows a logical flow diagram for a method of detecting abnormal passenger behavior in a cabin of a vehicle.

FIG. 3 shows a logical flow diagram for a method 300 of detecting abnormal passenger behavior in a cabin of a vehicle. In the description of the method 300, statements that a method, process, module, processor, system, or the like is performing some task or function refers to a controller or processor (e.g., the processor 200) executing programmed instructions (e.g., the program instructions 208) stored in non-transitory computer readable storage media (e.g., the memory 204) operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the processor 200 described herein can be performed by other components of the vehicle 100 and/or of the cabin monitoring system 108, such as the vehicle ECU 112 or integrated image processors of the sensors 134, 138. Additionally, in some embodiments, the operations of the processor 200 described herein can be performed by a remote server, such as in cloud computing system.

The method 300 begins with a step of receiving an image frame and incrementing a frame count (block 310). Particularly, the processor 200 of the vehicle computer 130 operates at least one of the image sensors 134, 138 to receive a video feed consisting of a sequence of image frames at a defined frame rate (e.g., 25 frames per second). In at least one embodiment, the processor 200 stores the received image frames in the memory 204 as image data 228. It will be appreciated that each image frame comprises a two-dimensional array of pixels. Each pixel at least has corresponding photometric information (e.g., intensity, color, and/or brightness). In some embodiments, the image sensors 134, 138 may also be configured to capture geometric information (e.g., depth and/or distance) corresponding to each pixel. In such embodiments, the image sensors 134, 138 may, for example, take the form of two RGB cameras configured to capture stereoscopic images from which depth and/or distance information can be derived, and/or an RGB camera with an associated IR camera configured to provide depth and/or distance information.

As will be discussed below, at least in some embodiments, certain processes of the method 300 are performed with respect to every image frame, whereas other processes are only performed every so many frames (e.g., every 75 frames or every 3 seconds). As described below, this may be defined in the form of a hyperparameter detect_every_frame having a numerical value (e.g., 75). Accordingly, in at least some embodiments, as each image frame is received and processed, the processor 200 of the vehicle computer 130 is configured to increment a frame count, which is for example stored in the memory 204.

The method 300 continues with a step of deriving an activity vector based on the image frame (block 320). Particularly, the processor 200 of the vehicle computer 130 calculates an activity vector $X_i$ for each image frame received from the image sensors 134, 138, where i indicates an index of the image frame. As used herein, an "activity vector" refers to a numerical vector representing at least (i) pose of at least one passenger in the image frame, and (ii) a motion of the at least one passenger in the image frame. As used herein, a "pose" of a passenger refers to a position, posture, orientation, or the like of the passenger. Particularly, in the detailed embodiments described herein, the activity vector represents the positions of a plurality of key points corresponding to particular joints and body parts of each passenger in the image frame, as well as directions and speeds of motion of those key points.

Figure 4:
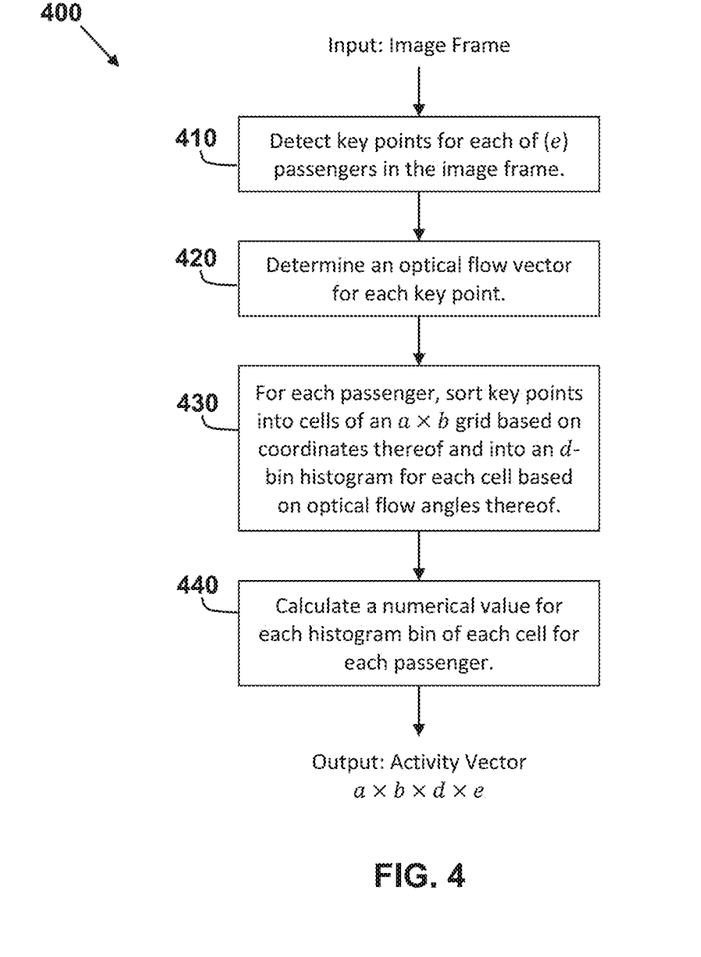
FIG. 4 shows a logical flow diagram for a method of deriving an activity vector for an image frame.

FIG. 4 shows a logical flow diagram for a method 400 of deriving an activity vector for an image frame. In the description of the method 400, statements that a method, process, module, processor, system, or the like is performing some task or function refers to a controller or processor (e.g., the processor 200) executing programmed instructions (e.g., the program instructions 208) stored in non-transitory computer readable storage media (e.g., the memory 204) operatively connected to the controller or processor to manipulate data or to operate one or more components in the cabin monitoring system 108 and/or the vehicle 100 to perform the task or function. Additionally, the steps of the methods may be performed in any feasible chronological order, regardless of the order shown in the figures or the order in which the steps are described. It will be appreciated that, in some embodiments, the operations of the processor 200 described herein can be performed by other components of the vehicle 100 and/or of the cabin monitoring system 108, such as the vehicle ECU 112 or integrated image processors of the sensors 134, 138, etc. Additionally, in some embodiments, the operations of the processor 200 described herein can be performed by a remote server, such as in cloud computing system.

Given an image frame, the method 400 begins with a step of detecting key points for each of (e) passengers in the image frame (block 410). Particularly, the processor 200 of the vehicle computer 130 detects a plurality of key points corresponding to particular joints or body parts of each passenger in the image frame using the pose detection model 220. In at least one embodiment, the processor 200 also detects the number of passengers (e) in the image frame using the pose detection model 220. In at least one embodiment, the pose detection model 220 comprises a deep neural network (DNN) which has been trained based on a corpus of training data (which is different from the training data discussed above used for training the GMM of the activity classification model 224). The processor 200 executes program instructions of the the pose detection model 220 with reference to a set of learned parameters, weights, and/or kernel values, which were learned during training of the pose detection model 220, to detect the plurality of key points for each passenger. In at least one embodiment, each key point is in the form of a two-dimensional coordinate pair $(x_t, y_t)$, where $x_t$ represents a horizontal position in the image frame, $y_t$ represents a vertical position in the image frame, and t represents a time or frame number of the image frame. However, it will be appreciated that three-dimensional coordinate triplets may be also be used in the case that the image sensors 134, 138 provide depth and/or distance information.

Figure 5:
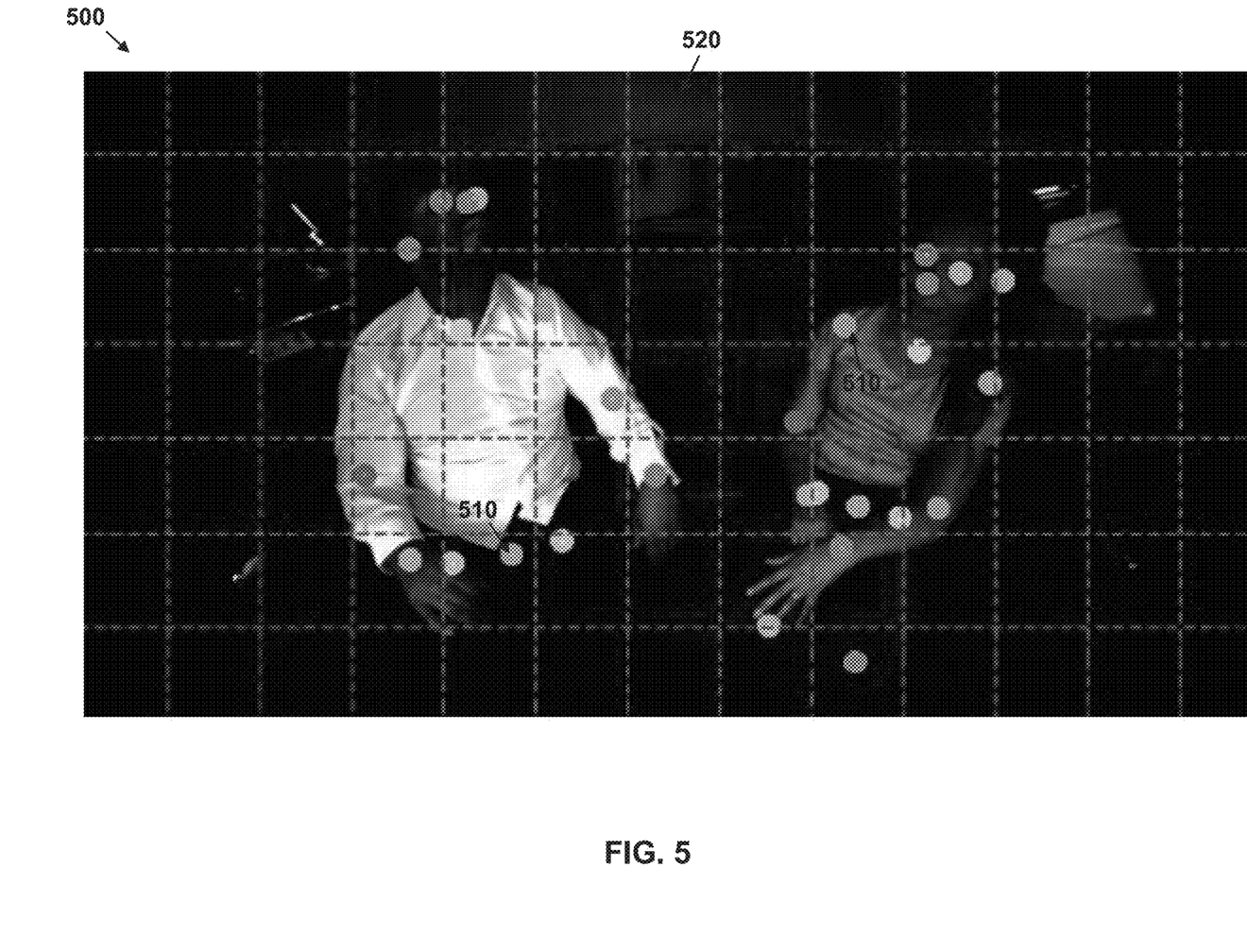
FIG. 5 shows an exemplary image frame in which two passengers are riding in the back seat of the vehicle.

FIG. 5 shows an exemplary image frame 500 in which two passengers are riding in the back seat of the vehicle 100. A plurality of key points 510 are identified for each of the two passengers. In the illustrated example, the pose detection model 220 is configured to detect 25 key points including: (1) Right Eye, (2) Left Eye, (3) Nose, (4) Right Ear, (5) Left Ear, (6) Neck, (7) Right Shoulder, (8) Left Shoulder, (9) Right Elbow, (10) Left Elbow, (11) Right Wrist, (12) Left Wrist, (13) Right Hip, (14) Middle Hip, (15) Left Hip, (16) Right Knee, (17) Left Knee, (18) Right Ankle, (19) Left Ankle, (20) Right Heel, (21) Left Heel, (22) Right Big Toe, (23) Left Big Toe, (24) Right Small Toe, and (25) Left Small Toe. However, it will be appreciated that certain key points 510 may be out of frame or occluded for a particular image frame.

In at least one embodiment, the processor 200 is configured to smooth values coordinate values that are predicted by the pose detection model 220 by for the key points of each passenger. Particularly, the predicted coordinate values provided by the pose detection model 220 may have some undesirable jittering between image frames due to limitations in model performance. To overcome such artifacts, the processor 200 is configured to calculate the coordinate values for each key point as an average of a sequence of predicted coordinate values from the pose detection model 220. Particularly, the processor 200 calculates the coordinate values for each key point at a time or frame number t according to the equation:

$$(x_t, y_t) = (\text{Median}_{k=t,t-1,\ldots,t-Pose_{smooth}}(x_k^*), \text{Median}_{k=t,t-1,\ldots,t-Pose_{smooth}}(y_k^*)),$$

where $(x_t^*, y_t^*)$ are predicted coordinate values provided by the pose detection model 220 at a time or frame number t, and $Pose_{smooth}$ is an integer-valued smoothing hyperparameter (e.g., 10). In other words, the processor 200 calculates calculate the coordinate values for each key point as an average of the predicted coordinate values for the current image frame and predicted coordinate values for a predetermined number $Pose_{smooth}$ of previous image frames.

Returning to FIG. 4, the method 400 continues with a step of determining an optical flow vector for each key point (block 420). Particularly, the processor 200 of the vehicle computer 130 calculates an optical flow vector for each key point representing a direction and speed of motion for respective key point. In some embodiments, the processor 200 each optical flow vector for a key point as a difference between the coordinate values for key point in the current image frame and the coordinate values for key point in a previous image frame. Particularly, in one embodiment, the processor 200 calculates the optical flow vector for a key point at a time or frame number t according to the equation:

$$(x_{t_{flow}}, y_{t_{flow}}) = (x_t - x_{t-Flow_{smooth}}, y_t - y_{t-Flow_{smooth}}),$$

where $(x_{t_{flow}}, y_{t_{flow}})$ is the optical flow vector for the key point $(x_t, y_t)$ at time t and $Flow_{smooth}$ is an integer-valued smoothing hyperparameter (e.g., 3).

Figure 6:
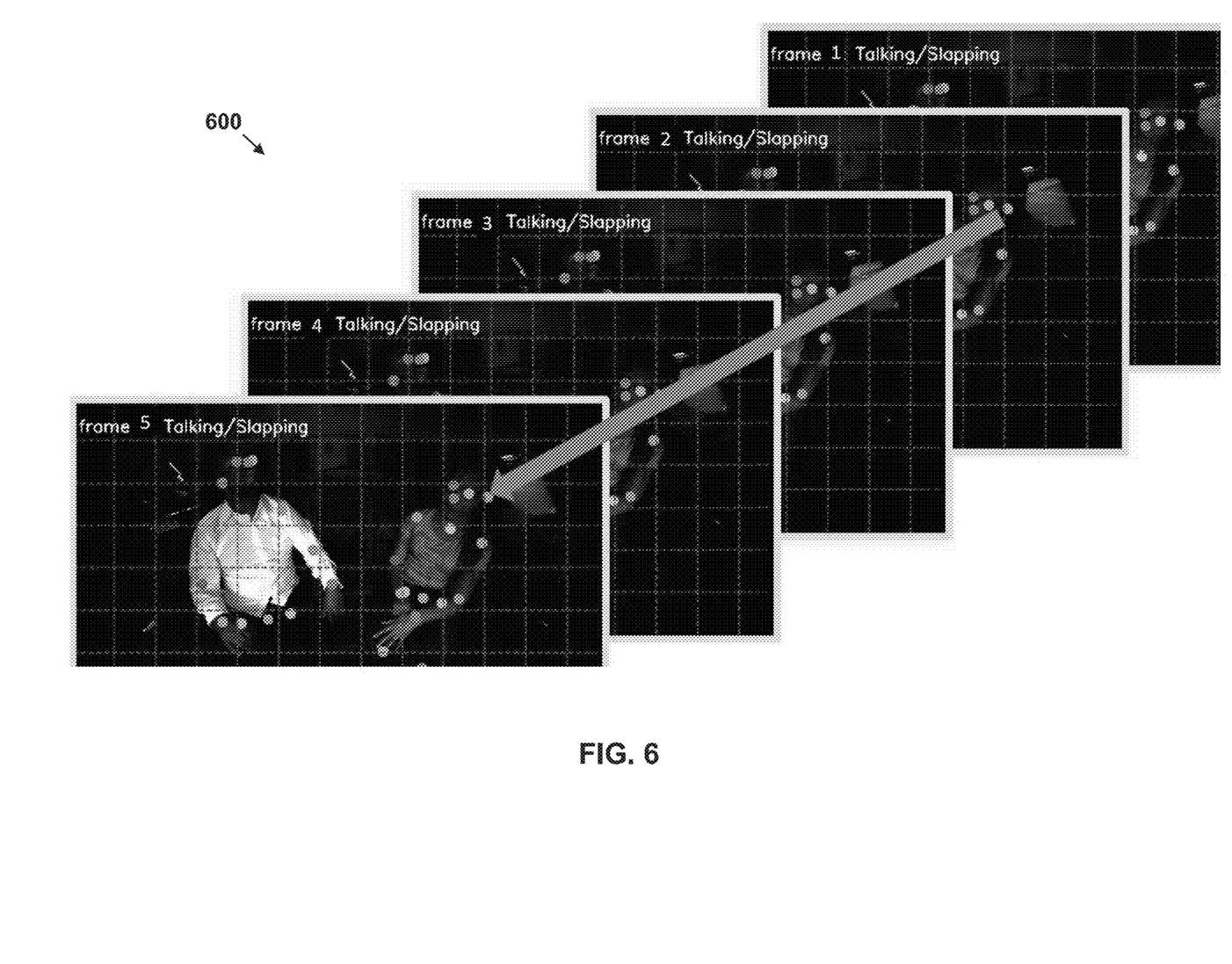
FIG. 6 shows an exemplary sequence of five image frames in which two passengers are riding in the back seat of the vehicle.

FIG. 6 shows an exemplary sequence 600 of five image frames in which two passengers are riding in the back seat of the vehicle 100. An optical flow vector for a key point corresponding to the left ear of the passenger on the right side of the image frames is calculated by comparing the coordinate values of the left ear key point in a frame at t=5 with the coordinate values of the left ear key point in a frame at t=2.

Returning to FIG. 4, the method 400 continues with a step of, for each passenger, sorting key points into cells of an a×b grid based on coordinates thereof and into an d-bin histogram for each cell based on optical flow angles thereof (block 430). Particularly, the received image frames are divided into a cells of a a×b grid, where a is an integer-valued grid height hyperparameter (e.g., 7) and b is an integer-valued grid width hyperparameter (e.g., 13). Each cell of the a×b grid represents a range of horizontal coordinate values and a range of vertical coordinate values within the image frame. In at least one embodiment, each cell of the a×b grid has an equal size. For example, with reference to FIG. 5, the exemplary image frame 500 is divided into a 7×13 grid of cells 520. The sequence 600 of five image frames of FIG. 6 is similarly divided into grids of cells.

Additionally, a d-bin histogram (e.g., a 3-bin histogram) is defined for each passenger for each cell of the a×b grid. Each of the d bins of in each histogram represents a range of optical flow angles. For example a 3-bin histogram might include a first bin representing a range of optical flow angles 0°-120°, a second bin representing a range of optical flow angles 120°-240°, and a third bin representing a range of optical flow angles 240°-360°. The optical flow angles may be with respect to any arbitrary zero-angle, such as with respect to the horizontal x-axis of the image frame and/or the a×b grid. It will be appreciated that the optical flow angle of an optical flow vector respect to the horizontal x-axis can be calculated according to the equation $\theta_{t_{flow}} = \tan^{-1}(y_{t_{flow}}/x_{t_{flow}})$, where $\theta_{t_{flow}}$ is the optical flow angle of an optical flow vector $(x_{t_{flow}}, y_{t_{flow}})$ for the key point $(x_t, y_t)$ at time t.

The processor 200 sorts the key points for each particular passenger into the cells of the a×b grid by comparing the coordinate values of the key points with the ranges of values corresponding to each particular cell of the a×b grid. In other words, if the coordinate values $(x_t, y_t)$ for a key point are within the range of values that define a particular cell of the a×b grid, then the processor 200 sorts the key point into that particular cell of the a×b grid. Next, the processor 200 sorts the key points for each passenger in each cell of the a×b grid into one of the bins in the respective d-bin histogram for the respective passenger for the respective cell of the a×b grid, by comparing the optical flow angles of the key points with the ranges of range of optical flow angles for the respective bins of the histograms. In other words, if a key point has an optical flow angle within the range of range of optical flow angles defined by a particular bin, then the processor sorts the key point into that particular bin. It will be appreciated that, since there are a× b cells each having an d-bin histogram for each of the e passengers, each key point is thus sorted in a respective one of a×b×d×e different bins, depending on their coordinate values $(x_t, y_t)$ and their optical flow angle $\theta_{t_{flow}}$.

The method 400 continues with a step of calculating a numerical value for each histogram bin of each cell for each passenger, resulting in an activity vector for the given image frame (block 440). Particularly, the processor 200 calculates, for each bin of each histogram in each cell for each passenger, a numerical value equal to a sum of the magnitudes of the optical flow vectors of the key points that have been sorted into the respective bin. More particularly, the processor 200 calculates the magnitude of the optical flow vector for each key point. It will be appreciated that the magnitude of an optical flow vector can be calculated according to the equation $M_{t_{flow}}^2 = x_{t_{flow}}^2 + y_{t_{flow}}^2$, where $M_{t_{flow}}$ is the magnitude of an optical flow vector $(x_{t_{flow}}, y_{t_{flow}})$ for the key point $(x_t, y_t)$ at time t. Finally, the processor 200 calculates the numerical value for each bin as a sum of the magnitudes of the optical flow vectors for the key points that were sorted into the respective bin. These calculated numerical values form an activity vector $X_i$ with dimensions a×b×d×e for the image frame, where i indicates an index of the image frame. It will be appreciated that the magnitude of the calculated numerical values scale with the amount of activity in the image frame in the respective region and direction defined by the respective cell and histogram bin. In this way, the activity vector $X_i$ encodes the movements and/or activity of the two passengers within the image frame in a numerical form that can be more easily evaluated.

Figure 7:
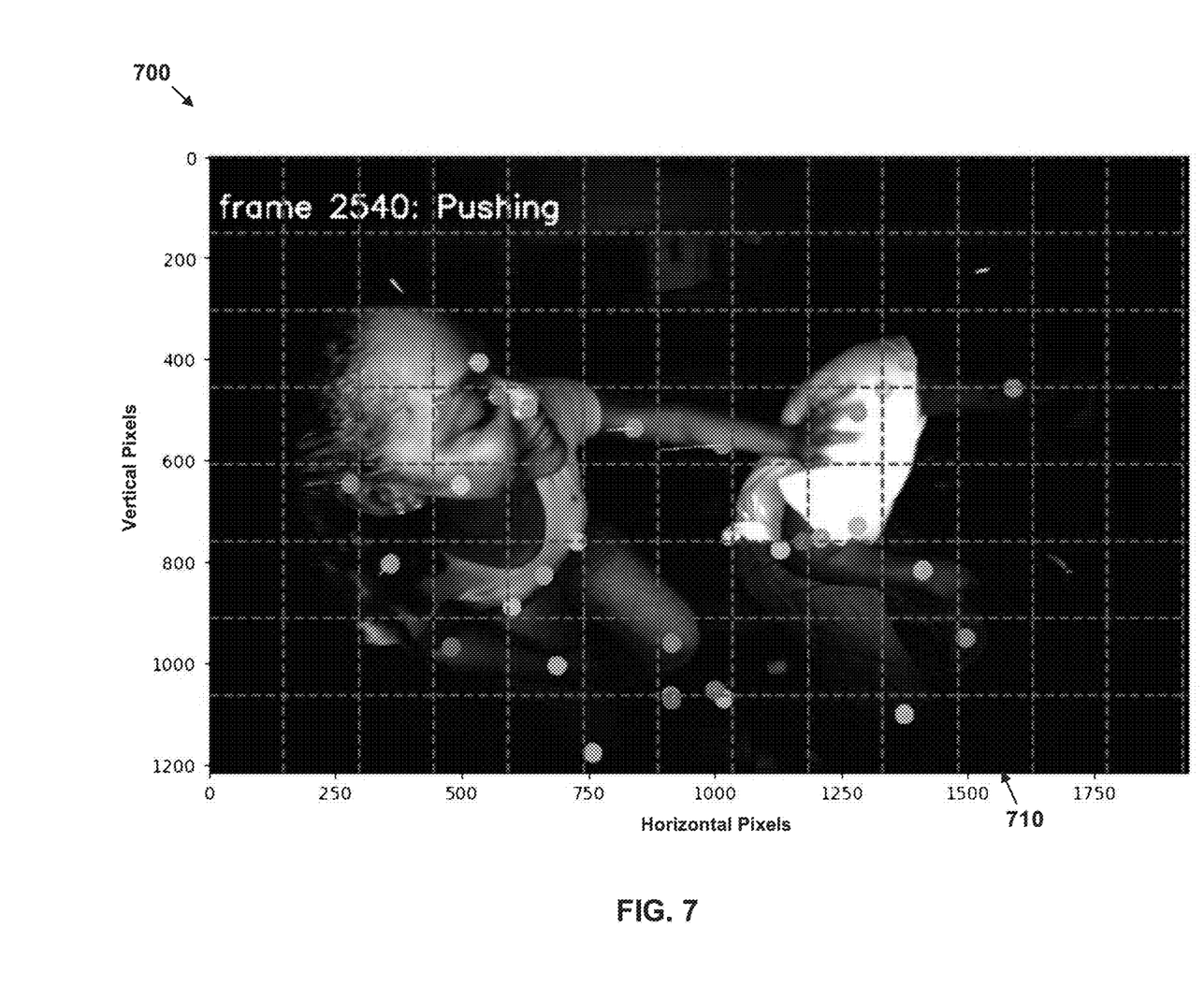
FIG. 7 shows a further exemplary image frame in which a passenger is pushing another passenger.
Figure 8:
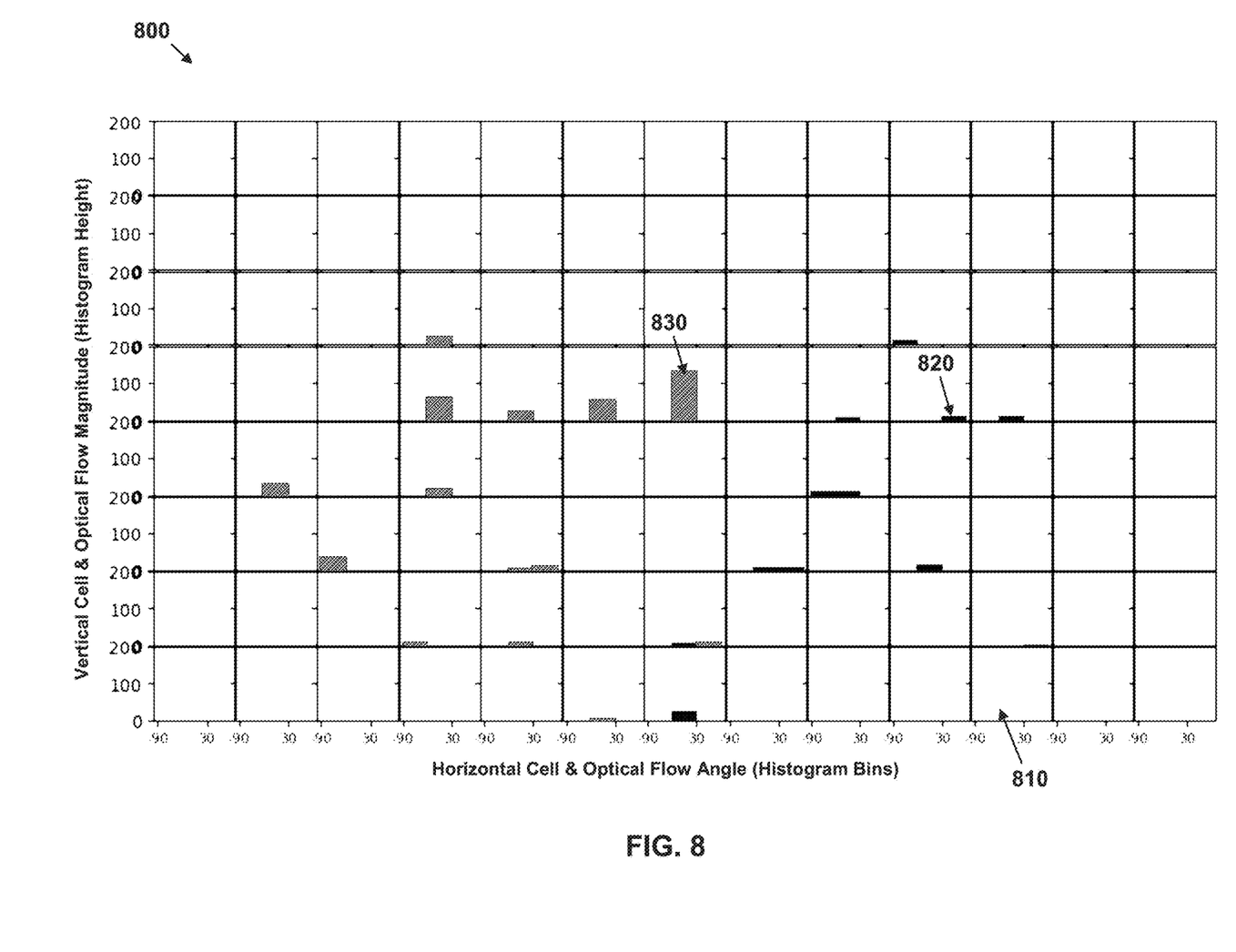
FIG. 8 shows a graph illustrating the activity vector calculated based on the exemplary image frame of FIG. 7.

FIG. 7 shows a further exemplary image frame 700 in which a passenger is pushing another passenger. FIG. 8 shows a graph 800 illustrating the activity vector calculated based on the exemplary image frame 700. In the graph 800, the cells 810 correspond to cells 710 of the exemplary image frame 700. In each cell 810 of the graph 800, a 3-bin histogram is shown for each of passenger. Particularly, the optical flow vectors and key points for passenger on the right hand side of the image frame 700 are represented with solid-black histogram bins 820 in the graph 800. Conversely, the optical flow vectors and key points for passenger on the left hand side of the image frame 700 are represented with diagonal-hatched histogram bins 830 in the graph 800. The heights of each histogram bin correspond to the calculated numerical values of the activity vector $X_i$. As can be seen, there is only minimal overlap of key points for the two the passengers (i.e., only one cell shows histograms for both passengers). Additionally, as can be seen, the cells corresponding the to the left arm of the passenger on the on the left hand side of the image frame 700 show diagonal-hatched histogram bins having comparatively large heights, indicating comparatively high magnitude motion (i.e. fast motion).

Returning to FIG. 3, the method 300 continues with a step of classifying the image frame into a cluster having a highest posterior probability, based on the activity vector (block 330). Particularly, for each image frame, the processor 200 determines which of a plurality of learned cluster components $C_i$ the activity vector $X_i$ most likely corresponds. More particularly, the processor 200 executes program instructions of the activity classification model 224, with reference to a plurality of learned cluster components $C_i$, to classify the activity vector $X_i$ as most likely belonging to a particular learned cluster component $C_i$. In other words, the cluster component $C_i$ is treated as a latent variable describing the class of activity represented in the image frame and is predicted based the measured activity vector $X_i$.

As noted above, the activity classification model 224 comprises a Gaussian Mixture Model (GMM) that defines a plurality of cluster components $C_i$ that correspond to normal passenger behavior. The cluster components $C_i$ each comprise a normal distribution $N(\mu_c, \Sigma_c)$ over the dimensions a×b×d×e (i.e., the same dimensions as the activity vectors $X_i$), where $\mu_c$ is a cluster center and/or median value having dimensions a×b×d×e and $\Sigma_c$ is a covariance matrix having dimensions a×b×d×e. The GMM of the activity classification model 224 is formed by k different cluster components $C_i$. In other words, given a cluster component, the per-frame activity vector is from p-dimensional multivariate normal:

$$C \sim \text{Categorical}(p_1, p_2, \ldots p_K)$$

$$X_i | C_i = c \sim N(\mu_c, \Sigma_c)$$

where the variable C is a categorical distribution with K different categories, $p_1, p_2, \ldots p_K$ are density functions with dimensions a×b×d×e that indicate the chance of the variable C to take a particular value c, and $N(\mu_c, \Sigma_c)$ is the normal distribution for a particular value c.

Based on the activity vector $X_i$ for the particular image frame, the processor 200 classifies the image frame into the cluster component $C_i$ with the highest posterior probability according to the equation:

$$c_i = \text{argmax}_k Pr(C_i = k | X_i).$$

In other words, for each value i=1, ..., k, the processor 200 calculates the posterior probability $Pr(C_i = k | X_i)$, indicating a probability that the activity vector $X_i$ belongs to the particular cluster component $C_i$. The processor classifies the activity vector $X_i$ as belonging to the cluster component $C_i$ having the highest posterior probability $Pr(C_i = k | X_i)$. The cluster component $C_i$ to which the activity vector $X_i$ belongs is denoted herein as $c_i$. In at least one embodiment, the processor 200 stores the determined cluster component $c_i$ to which the activity vector $X_i$ most likely belongs in the memory 204.

As suggested above, prior to deployment of the cabin monitoring system 104, the plurality of cluster components $C_i$ are learned based on unlabeled training data in the form of video of passengers riding in the cabin 108 of the vehicle 100. Particularly, a large set of training activity vectors are derived from the image frames from the training video in the manner described above with respect to FIG. 4. The large set of training activity vectors $X_i$ is used to derive the GMM having k different cluster components $C_i$ that best model the large set of training activity vectors $X_i$. The unknown parameters $\mu_c$ and $\Sigma_c$ for each cluster component $C_i$ are estimated using the Expectation-Maximization Algorithm.

Additionally, it will be appreciated that GMMs require that the number of cluster components k be pre-specified. In at least one embodiment, the number of cluster components k is selected by Akaike Information Criteria (AIC). AIC is defined as:

$$AIC = 2 \ln P - \ln L,$$

$$L = f\left(\{X_i\}_{i=1}^n; \left\{\mu_l, \sum_l c_l\right\}_{l=1}^K\right)$$

$$= \prod_{i=1}^n f\left(X_i; \left\{\mu_l, \sum_l c_l\right\}_{l=1}^K\right)$$

$$= \prod_{i=1}^n f\left(X_i \mid C_i = c; \mu_c, \sum_c\right) f(C_i = c; p_c)$$

$$= \prod_{i=1}^n N\left(X_i; \mu_c, \sum_c\right) p_c,$$

where P is the number of unknown parameters (i.e., $\mu_l$, $\Sigma_l$, and $c_l$, where l=1, . . . , K) to be estimated and L is the likelihood function or, in other words, the density at observed training activity vectors $X_i$, i=1, . . . n, where n is the total number of training activity vectors $X_i$.

A smaller AIC indicates better fit of the model while penalizing the use of complex model, measured by the number of unknown parameters P. In one embodiment, the AIC is calculated for a predetermined range of values for k (e.g., k=1, . . . , 20) and the value of k resulting in the lowest AIC is used for deriving the GMM of the activity classification model 224.

In at least one embodiment, this training process is uniquely performed for different numbers of passengers using unlabeled training data in the form of video of the respective number of passengers riding in the cabin 108 of the vehicle 100. Particularly, respective pluralities of cluster components $C_i$ may be learned for a single passenger riding alone, for two passengers riding together, for three passengers riding together, and so on, up to some reasonable upper limit on the number of passengers expected to ride in a particular area of the cabin 108 that is in view of an image sensor.

The method 300 continues with a step of determining a posterior density for the image frame (block 340). Particularly, once the cluster component $c_i$ to which the activity vector $X_i$ most likely belongs is determined, the processor 200 calculates the posterior density according to the equation:

posterior density$_i$=$f(X_i|C_i=c_i)$, where f( ) is the probability density function of the GMM, which is evaluated given the activity vector $X_i$ and the determined cluster component $c_i$. In at least one embodiment, the processor stores the posterior density$_i$ for the image frame in the memory 204

As described below, the image frame can be considered an anomaly or as including abnormal passenger behavior if the determined posterior density for the image frame is below a predefined threshold. In this way, the processor 200 can detect abnormal passenger behavior on a frame-by-frame basis by comparing the posterior density for each image frame with the predefined threshold. However, it is generally not necessary to detect whether anomaly arises at every frame (e.g., every $\frac{1}{25}$=0.04 second), because the abnormal behavior situation would not change at such a high frequency. Thus, in at least one embodiment, the processor 200 instead detects abnormal passenger behavior only every so many frames based on an average posterior density over several frames.

The method 300 repeats the steps 310-340 to determine posterior densities for a sequence of image frames until the frame count is equal to a threshold number of frames (block 350). Particularly, as noted above, as each frame is received, the processor 200 increments a frame_count. As each image frame is received, the processor 200 repeats the processes of deriving an activity vector $X_i$, determining the cluster component $c_i$ to which the activity vector $X_i$ most likely belongs, and calculating a posterior density$_i$ for the image frame, until the frame_count is equal to the hyperparameter detect_every_frame (e.g., 75, such that, at 25 frames per second, abnormal behavior is detected every 3 seconds).

The method 300 continues with a step of checking whether an average posterior density for the sequence of image frames is less than a threshold (block 360). Particularly, the processor 200 calculates an average of the posterior density$_i$ for all of the image frames received since the frame_count was last reset and abnormal behavior detection was last performed, and compares the average with a predetermined anomaly threshold. In other words, the processor 200 evaluates the equation:

$$\frac{\sum_{k=t-detect\_every\_frame}^{t} f(X_i \mid C_i = c_i)}{detect\_every\_frame} < threshold.$$

If the average posterior density is less than the threshold, the method 300 continues with detecting abnormal passenger behavior (block 370). Particularly, in response to the average posterior density being less than the predetermined anomaly threshold, the processor 200 detects that abnormal passenger behavior has occurred. In at least one embodiment, in response to detecting abnormal passenger behavior, the processor 200 operates the transceivers 212 to transmit an anomaly notification message to a remote server, such as a cloud backend or remote database. The anomaly notification message may include the image frame and/or the activity vector $X_i$ with respect to which the abnormal passenger behavior was detected.

The remote server may, for example, be accessible by an operator of an autonomous taxi service or other similar autonomous vehicle service or shared vehicle service and may interface with an external cloud service associated with the service. In one embodiment, the remote server is configured to notify (e.g., via email or the like) the operator in response to abnormal behavior being detected. In other embodiments, the operator can access the relevant image data and/or abnormal behavior event data stored on the remote server via a web portal.

In further embodiments, in response to detecting abnormal passenger behavior, the processor 200 may operate a speaker or display screen (not shown) arrange within the cabin 108 of the vehicle 100 to display, play, or otherwise output an alert or warning to the passengers, for example urging the passengers to cease the abnormal behavior.

Regardless of whether the average posterior density is less than the threshold, the method 300 continues with a step of resetting the frame count before repeating the method 300 entirely (block 380). Particularly, after the abnormal behavior detection, the processor 200 resets the frame_count to zero and repeats the processes of receiving image frames, deriving activity vectors $X_i$, determining the cluster components $c_i$ to which the activity vectors $X_i$ most likely belong, and calculating a posterior density$_i$ for each image frame, until the frame_count is equal to the hyperparameter detect_every_frame, before performing the abnormal behavior detection again.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for detecting abnormal passenger behavior in a vehicle, the method comprising:

receiving, with a processing system, a first image frame of at least one passenger in a cabin of the vehicle from an image sensor;

determining, with the processing system, based on the first image frame, a first numerical vector representing a pose and a motion of the at least one passenger in the first image frame, the determining the first numerical vector including determining, with the processing system, a respective plurality of key points for each of the at least one passenger, each key point including a coordinate pair corresponding to a position of a respective joint or body part of the at least one passenger within the first image frame; and detecting, with the processing system, based on the first numerical vector, abnormal passenger behavior in the first image frame using a mixture model having a plurality of cluster components representing normal passenger behaviors.

2. The method of claim 1, the determining the respective plurality of key points for each of the at least one passenger further comprising:

determining, with the processing system, the coordinate pair of each key point of the respective plurality of key points for each of the at least one passenger as an average position of the respective joint or body part of the at least one passenger over multiple image frames including the first image frame and at least one previous image frame.

3. The method of claim 1, the determining the first numerical vector further comprising:

determining, with the processing system, for each respective key point of the respective plurality of key points for each of the at least one passenger, an optical flow vector indicating a motion of the respective key point in the first image frame with respect to at least one previous image frame.

4. The method of claim 3, the determining the optical flow vector further comprising:

determining, with the processing system, a difference between the coordinate pair of the respective key point in the first image frame and a previous coordinate pair of the respective key point in a previous image frame.

5. The method of claim 3, the determining the first numerical vector further comprising:

sorting, with the processing system, each respective key point of the respective plurality of key points for each of the at least one passenger into a respective cell of a two-dimensional grid of cells based on the coordinate pair of the respective key point, where each respective cell of the grid corresponds to a range of coordinates within the first image frame;

sorting, with the processing system, each respective key point sorted into each respective cell of the grid into a respective bin of a respective histogram for each of the at least one passenger based on an optical flow angle of the optical flow vector of the respective key point, where each bin of the respective histogram for each of the at least one passenger corresponds to a range of optical flow angles;

determining, with the processing system, a numerical value for each respective bin of the respective histogram for each of the at least one passenger as a sum of optical flow magnitudes for the optical flow vectors of each respective key point sorted into the respective bin; and forming, with the processing system, the first numerical vector with the numerical value for each bin of the respective histogram for each of the at least one passenger.

6. The method according to claim 5, wherein the first numerical vector has dimensions a×b×d×e, where a×b are dimensions of the grid, d is a number of bins in the respective histogram for each of the at least one passenger, and e is a number of passengers of the at least one passenger.

7. The method of claim 1, the detecting abnormal passenger behavior further comprising:

determining, with the processing system, for each respective cluster component of the plurality of cluster components of the mixture model, a posterior probability that the first numerical vector belongs to the respective cluster component; and classifying, with the processing system, the first image frame as belonging to a first cluster component of the plurality of cluster components of the mixture model having a highest posterior probability.

8. The method of claim 7, the detecting abnormal passenger behavior further comprising:

determining, with the processing system, a first posterior density based on the first numerical vector and the first cluster component of the plurality of cluster components of the mixture model.

9. The method according to claim 8, the detecting abnormal passenger behavior further comprising:

comparing, with the processing system, the first posterior density with a predetermined threshold; and detecting the abnormal passenger behavior in the first image frame in response to the first posterior density being less than the predetermined threshold.

10. The method according to claim 8, the detecting abnormal passenger behavior further comprising:

determining, with the processing system, an average posterior density over multiple image frames including the first image frame and at least one previous image frame;

comparing, with the processing system, the average posterior density with a predetermined threshold; and detecting the abnormal passenger behavior in the first image frame in response to the average posterior density being less than the predetermined threshold.

11. The method according to claim 1, wherein the plurality of cluster components are learned using unlabeled training data, the unlabeled training data including a corpus of video of at least one passenger riding in the vehicle.

12. The method according to claim 1 further comprising:

transmitting, with a transceiver, a message to a remote server in response to detecting abnormal passenger behavior.

13. The method according to claim 1 further comprising:
outputting, with a speaker or display screen, an alert to the at least one passenger in response to detecting abnormal passenger behavior.

14. A system for detecting abnormal passenger behavior in a vehicle, the system comprising:
an image sensor configured to generate and output image frames of at least one passenger in a cabin of the vehicle;
a processing system operably connected to the image sensor and including at least one processor, the processing system configured to:
receive a first image frame of at least one passenger in a cabin of the vehicle from the image sensor;
determine, based on the first image frame, a first numerical vector representing a pose and a motion of the at least one passenger in the first image frame; and
detect, based on the first numerical vector, abnormal passenger behavior in the first image frame using a mixture model having a plurality of cluster components representing normal passenger behaviors, the abnormal passenger behavior being detected by (i) determining, for each respective cluster component of the plurality of cluster components of the mixture model, a posterior probability that the first numerical vector belongs to the respective cluster component, and (ii) classifying the first image frame as belonging to a first cluster component of the plurality of cluster components of the mixture model having a highest posterior probability.

15. The system of claim 14, the processing system further configured to, in the determination of the first numerical vector:
determine a respective plurality of key points for each of the at least one passenger, each key point including a coordinate pair corresponding to a position of a respective joint or body part of the at least one passenger within the first image frame; and
determine, for each respective key point of the respective plurality of key points for each of the at least one passenger, an optical flow vector indicating a motion of the respective key point in the first image frame with respect to at least one previous image frame.

16. The system of claim 15, the processing system further configured to, in the determination of the first numerical vector:
sort each respective key point of the respective plurality of key points for each of the at least one passenger into a respective cell of a two-dimensional grid of cells based on the coordinate pair of the respective key point, where each respective cell of the grid corresponds to a range of coordinates within the first image frame;
sort each respective key point sorted into each respective cell of the grid into a respective bin of a respective histogram for each of the at least one passenger based on an optical flow angle of the optical flow vector of the respective key point, where each respective bin of the respective histogram for each of the at least one passenger corresponds to a range of optical flow angles;
determine a numerical value for each respective bin of the respective histogram for each of the at least one passenger as a sum of optical flow magnitudes for the optical flow vectors of each respective key point sorted into the respective bin; and
form the first numerical vector with the numerical value for each respective bin of the respective histogram for each of the at least one passenger.

17. The system of claim 14, the processing system further configured to, in the detection of the abnormal passenger behavior:
determine a first posterior density based on the first numerical vector and the first cluster component of the plurality of cluster components of the mixture model.

18. The system of claim 17, the processing system further configured to, in the detection of the abnormal passenger behavior:
determine an average posterior density over multiple image frames including the first image frame and at least one previous image frame;
compare the average posterior density with a predetermined threshold; and
detect the abnormal passenger behavior in the first image frame in response to the average posterior density being less than the predetermined threshold.

19. The system of claim 14 further comprising:
a transceiver operably connected to the processing system,
wherein the processing system is configured to operate the transceiver to transmit a message to a remote server in response to detecting abnormal passenger behavior.

20. A method for detecting abnormal passenger behavior in a vehicle, the method comprising:
receiving, with a processing system, a first image frame of at least one passenger in a cabin of the vehicle from an image sensor;
determining, with the processing system, based on the first image frame, a first numerical vector representing a pose and a motion of the at least one passenger in the first image frame; and
detecting, with the processing system, based on the first numerical vector, abnormal passenger behavior in the first image frame using a mixture model having a plurality of cluster components representing normal passenger behaviors,
wherein the plurality of cluster components are learned using unlabeled training data, the unlabeled training data including a corpus of video of at least one passenger riding in the vehicle.

* * * * *